US008153203B2

(12) United States Patent
Schnur et al.

(10) Patent No.: US 8,153,203 B2
(45) Date of Patent: Apr. 10, 2012

(54) CONDUCTIVE MICROCYLINDER-BASED PAINTS FOR INTEGRATED ANTENNAS

(75) Inventors: Joel M Schnur, Burke, VA (US); Walter J Dressick, Waldorf, MD (US); Ronald R Price, Stevensville, MD (US); Paul E Schoen, Alexandria, VA (US); Alok Singh, Springfield, VA (US); Daniel Zabetakis, Brandywine, MD (US); Michael A. Dinderman, Bethesda, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 562 days.

(21) Appl. No.: 12/352,062

(22) Filed: Jan. 12, 2009

(65) Prior Publication Data

US 2010/0178421 A1    Jul. 15, 2010

(51) Int. Cl.
*B05D 1/02* (2006.01)
(52) U.S. Cl. .............. 427/421.1; 427/426; 427/427.4
(58) Field of Classification Search .............. 427/180, 427/372.2, 240, 437, 421, 426, 427.4; 428/313.3, 428/315.5, 327; 118/52
See application file for complete search history.

(56) References Cited

U.S. PATENT DOCUMENTS

| | | | | |
|---|---|---|---|---|
| 2,097,416 A | * | 10/1937 | Neiley | 264/257 |
| 3,998,720 A | * | 12/1976 | Shibayama et al. | 204/624 |
| 5,204,401 A | * | 4/1993 | Anderson et al. | 524/441 |
| 5,295,626 A | * | 3/1994 | Mirabito | 239/526 |
| 5,916,625 A | * | 6/1999 | Rosenberger et al. | 427/8 |
| 6,013,206 A | | 1/2000 | Price et al. | |
| 6,382,299 B1 | | 5/2002 | Zabetakis | |
| 6,452,564 B1 | * | 9/2002 | Schoen et al. | 343/872 |
| 6,576,336 B1 | * | 6/2003 | LeGrande | 428/327 |
| 6,913,828 B2 | | 7/2005 | Zabetakis | |
| 7,125,476 B2 | | 10/2006 | Schoen et al. | |
| 2004/0263405 A1 | * | 12/2004 | Kogure et al. | 343/713 |
| 2005/0260345 A1 | * | 11/2005 | Lubomirsky et al. | 427/240 |
| 2005/0272846 A1 | * | 12/2005 | Price et al. | 524/439 |
| 2006/0001572 A1 | * | 1/2006 | Gaucher et al. | 343/701 |
| 2007/0025821 A1 | * | 2/2007 | Ellenberger | 405/264 |

FOREIGN PATENT DOCUMENTS

WO    WO 2007022810 A1 *    3/2007

* cited by examiner

*Primary Examiner* — Brian K Talbot
(74) *Attorney, Agent, or Firm* — Amy L. Ressing; Rebecca L. Forman

(57) ABSTRACT

The present invention is directed to a method for making a conformal antenna on a surface by providing a composition comprising a polymer matrix and a plurality of metalized tubules and applying the composition to the surface as two parallel wires connected at their ends to make a closed loop with one of the parallel wires broken in the middle. Also disclosed is an alternate method for making a conformal antenna on a surface by spraying a first material comprising a polymer matrix onto the surface and simultaneously spraying a second material comprising a plurality of metalized tubules and a coagulant onto the surface, wherein the first and second materials mix together during the spraying. A further method for making a conformal antenna includes spraying a first material comprising a polymer matrix and a plurality of metalized tubules onto the surface and simultaneously spraying a second material comprising an aqueous electroless plating bath onto the surface, wherein the first and second materials mix together during the spraying.

5 Claims, No Drawings

CONDUCTIVE MICROCYLINDER-BASED PAINTS FOR INTEGRATED ANTENNAS

BACKGROUND OF THE INVENTION

1. Field of the Invention

The present invention relates generally to conductive paints using a polymer and conductive metalized lipid-based microtubules and, more particularly, to sprayable, microcylinder-based paints for conformal antennas.

2. Description of the Prior Art

There are many current materials consisting of a conductive metal component and a polymer matrix for use in various applications as conductive paints, adhesives, gasket-forming material, or putties. These typically involve the use of metal powders such as finely-divided copper or silver. In order to achieve overall conductivity, the metal loading in these products must be very high. This makes the product both heavy and expensive. Also, the high loading can compromise the important properties conveyed by the polymer (such as toughness, adhesion, and environmental resistance) since the polymer forms a reduced volume fraction of the composite. The high loading is required because of the small size and overall round shape of the powders. In order to achieve a conductive material the individual particles must be so close to each other as to be touching.

BRIEF SUMMARY OF THE INVENTION

The aforementioned problems are overcome in the present invention which provides a method for making a conformal antenna on a surface by providing a composition comprising a polymer matrix and a plurality of metalized tubules and applying the composition to the surface as two parallel wires connected at their ends to make a closed loop with one of the parallel wires broken in the middle. Also disclosed is an alternate method for making a conformal antenna on a surface by spraying a first material comprising a polymer matrix onto the surface and simultaneously spraying a second material comprising a plurality of metalized tubules and a coagulant onto the surface, wherein the first and second materials mix together during the spraying. A further method for making a conformal antenna includes spraying a first material comprising a polymer matrix and a plurality of metalized tubules onto the surface and simultaneously spraying a second material comprising an aqueous electroless plating bath onto the surface, wherein the first and second materials mix together during the spraying.

The present invention has many advantages over the prior art. Due to the high aspect-ratio of the tubules, a greatly reduced loading is required to achieve a conductive composite. This effect is multiplied by the fact that the tubules are hollow, thus using less metal and having less mass. Together these reduce both the cost and the weight of the conductive paint or other metal-polymer composite. Since these tubules are microscopic in size they are compatible with existing spray technologies.

These and other features and advantages of the invention, as well as the invention itself, will become better understood by reference to the following detailed description and appended claims.

DETAILED DESCRIPTION OF THE INVENTION

According to the present invention, conductive paints using a polymer and conductive metalized lipid-based microtubules are used for conformal antennas. Tubules are microscopic cylinders that self assemble from diacetylenic lipids. The formation occurs when the lipid is first dissolved in alcohol/water solution at ~60° C., and then the temperature is dropped to room temperature. The tubules are about one micron in diameter and about 50-100 microns long, i.e., with an aspect ratio of about 75.

The high aspect ratio of the tubule suggests possible interactions with radio waves, but only if they are electrically conductive. A method of metallizing them by electroless plating has been devised, that produces metal coated tubules (copper, nickel, gold, silver, cobalt, and iron are some possible metal species), and in the process the aspect ratio is reduced to about 25-30, due to breakage. See Zabetakis, *J. Mater. Res.* 15(11): 2368-2374 2000, the entire contents of which are incorporated herein by reference.

Metals used in the production of hollow conductive tubules can be gold, silver, iron, nickel, copper, or other conductive and depositable metal. Coatings can be single or multi-layered, such as nickel or gold over copper.

Applications have been studied that involve mixing the metal tubules into a polymer matrix to produce a dielectric composite. Depending on the amount of tubules loaded into the matrix, the composite can be quite lossy, and the material can be used to absorb microwave radiation. See, e.g., Browning et al., *J. Appl. Phys.* 84(11): 6109-6113 1998, the entire contents of which are incorporated herein by reference.

If the loading is increased, the tubules no longer are dispersed independent of each other, but begin to touch each other, forming a conductive network within the composite. With sufficient loading the composite becomes a macroscopic conductor with very low electrical resistance. In this case, applications that depend on having a highly conducting material become possible. Two such applications are conductive sheets, which instead of absorbing microwaves will reflect them, and conductive lines or wires, which will carry electromagnetic signals. This latter shape can also be considered for antenna formation.

To facilitate such applications, the polymer matrix used to suspend the tubules can be a paint, so that the composite sheet or wire can be applied to a surface by spraying, dip coating, or other appropriate application method, and the shape defined by masking. One paint of choice is a water-based latex with low volatile organic compounds (VOCs) such that it can be sprayed without environmental concerns.

The polymer used in the composite is not limited by this technology. The choice of polymer will be determined by the application. For conductive paints, a latex or polyurethane would be a typical choice.

Formulations were tested using commercially available paints, specifically water based urethanes. Loading of the paint with copper coated tubules was sufficient to amount to about 10-15% of the volume of the paint after it dries. The mixture was applied to a substrate with sufficient amount of compound that the layer was about 0.040 inches thick after drying. This allowed the sheet of paint to be lifted from the substrate after drying so that the electrical properties of the composite could be measured. It was found that the resistance per square of the sheet on the bottom side was less than 0.1 ohm/square and similar to a solid metal copper sheet we used for comparison. On the top side, the resistance was high, essentially a non-conductor. The metal tubules obviously settle to the bottom of the paint composite as the water evaporates, producing a conducting layer on the side of the material.

The design of the sheet could be changed to that of a wire, particularly to a wire in the folded dipole design of an FM radio antenna. This involves two parallel wires, each about 120 cm long and separate from the other by a small distance (a few cm at most). The two wires are connected to each other at their ends to make a closed loop, and one of the wires is broken in the middle. Lead wires are attached to each side of the break, and these leads then carry signal to the FM antenna inputs of a radio.

In the case of a painted antenna, the leads would be incorporated into the wires before they dried in place. If the painted antenna needed to be insulated from the substrate on which it was painted, an insulating primer paint coat could be applied first. Color for the antenna could be mixed in with the tubules, or a colored overcoat with appropriate pigment could be used.

It is intended that these materials be used for typical civilian applications such as cellular phones, satellite radios and communication, and GPS navigation units. The frequency band covered by these is approximately 800 MHz to 5.4 GHz, but this disclosure is generally applicable to the broader range of 10 kHz to 100 GHz.

An alternate method for antennae fabrication includes simultaneously spraying two materials which mix together in the spray stream. A dual spray nozzle may be used so the two materials are mixed at the nozzle head. One material is the aqueous tubule-latex composite mixture mentioned above. The second material is a mixture of an aqueous electroless plating bath and a latex component. The concentration of tubules in the mixture will be such that the concentration in the final polymer will be equal to that desired for the shielding effects. Mixture of these two streams occurs during spray coating of the deposit to infuse electroless plating bath into the composite film. As the film organizes on the surface to be coated, the electroless bath can plate additional metal onto the already metallized tubules within the film, increasing the degree of metal interconnectivity between adjacent tubules and improving the electrical conductivity of the deposit as required for antennae use.

Another alternative is simultaneously spraying 1) a rubber latex solution, and 2) a mixture of metallized tubules, ethanol, and calcium nitrate. Again, the two materials mix together in the spray stream, and a dual spray nozzle may be used to the materials mix at the nozzle head. Solution (1) provides the polymer and solution (2) provides the tubules with a coagulant to quick-set the polymer. The coagulant will fix the tubules in place once sprayed and reduce the tendency to settle, run, or otherwise move prior to curing of the polymer. Additives (such as to modify the color, texture, modulus, hardness and resistance to oxidation) can be added to the latex component.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," are not to be construed as limiting the element to the singular.

What is claimed as new and desired to be protected by Letters Patent of the United States is:

1. A method for making an integrated antenna on a surface, comprising:
   a. spraying a first material comprising a polymer matrix and a plurality of metalized tubules onto the surface; and
   b. simultaneously spraying a second material comprising an aqueous electroless plating bath onto the surface;
   wherein the first and second materials mix together during the spraying.

2. The method of claim 1, wherein the first and second materials are sprayed using a dual spray nozzle.

3. The method of claim 1, wherein the polymer matrix is a paint.

4. The method of claim 1, wherein the tubules are metalized with copper, nickel, gold, silver, cobalt, iron, or any combination thereof.

5. The method of claim 1, wherein the first material additionally comprises a color pigment.

* * * * *